United States Patent [19]

Katoh et al.

[11] Patent Number: 5,680,848
[45] Date of Patent: Oct. 28, 1997

[54] VAPORIZED FUEL CONTROL VALVE FOR FUEL TANK OF INTERNAL COMBUSTION ENGINE

[75] Inventors: Takaaki Katoh; Takeshi Suzuki; Masaaki Horiuchi; Takeaki Nakajima; Koichi Hidano, all of Wako, Japan

[73] Assignee: Honda Giken Kogyo Kabushiki Kaisha, Tokyo, Japan

[21] Appl. No.: 684,620

[22] Filed: Jul. 22, 1996

[30] Foreign Application Priority Data

Jul. 25, 1995 [JP] Japan .................... 7-189020

[51] Int. Cl.[6] .................... F02M 33/02
[52] U.S. Cl. .................... 123/518; 123/516; 137/587; 137/550
[58] Field of Search .................... 137/550, 587, 137/578; 251/43, 127; 123/516, 518, 519

[56] References Cited

U.S. PATENT DOCUMENTS

| | | | |
|---|---|---|---|
| 4,241,873 | 12/1980 | Satomoto | 137/550 |
| 4,951,878 | 8/1990 | Casey et al. | 251/127 |
| 5,156,178 | 10/1992 | Harris | 123/516 |
| 5,163,468 | 11/1992 | Robinson et al. | 137/550 |
| 5,261,439 | 11/1993 | Harris | 123/516 |
| 5,404,907 | 4/1995 | Benjey et al. | 137/587 |

FOREIGN PATENT DOCUMENTS

08100728 A 4/1996 Japan.

*Primary Examiner*—Thomas N. Moulis
*Attorney, Agent, or Firm*—Nikaido, Marmelstein, Murray & Oram LLP

[57] ABSTRACT

A vaporized fuel control valve for a fuel tank containing fuel to be supplied to an internal combustion engine, having a casing fastened to an upper surface of the fuel tank, and a float valve is housed in the casing such that it moves upward toward a seat in response to fuel level in the fuel tank. A diaphragm valve having a diaphragm is placed in the casing above the float valve for separating an interior of the casing to a first chamber communicating with a filler pipe of the fuel tank, and a second chamber communicating with the fuel tank through the float valve. The diaphragm valve opens to connect the second chamber with a canister such that vaporized fuel forced out of the fuel tank flows along a path through the float valve to the canister when the first chamber is supplied with atmospheric pressure, unless the float valve seats on the seat. In the valve, an intercepter such as a filter is placed in the path to intercept a fuel spray produced due to an impact when the float valve has seated on the seat, so as the fuel spray not to adhere to the diaphragm. As the interceptor, various partitions different in shape are used. With the arrangement, adherence of sprayed fuel, which otherwise degrades the diaphragm, is prevented.

17 Claims, 16 Drawing Sheets

VAPORIZED FUEL CONTROL VALVE FOR FUEL TANK OF INTERNAL COMBUSTION ENGINE

BACKGROUND OF THE INVENTION

1. Field of the Invention

This invention relates to a vaporized fuel control valve for a fuel tank of an internal combustion engine, more particularly to a vaporized fuel control valve for a fuel tank containing fuel to be supplied to an internal combustion engine, wherein a fuel spray from the tank which may be adhered to a diaphragm valve is prevented.

2. Description of the Related Art

A valve for controlling fuel vaporized from a fuel tank is known, wherein a filler port communicating chamber communicating with the vicinity of a filler port of the fuel tank (containing fuel to be supplied to an internal combustion engine) and a float valve communicating chamber communicating with a float valve opened by rise of the fuel level in the fuel tank are defined in a casing provided on the upper surface of the fuel tank, and a canister communicating port communicating the float valve communicating chamber with a canister is opened and closed by a diaphragm valve operated by the pressure difference between the filler port communicating chamber and the float valve communicating chamber. Such a device is proposed by the assignee in Japanese Laid-Open Patent Application No. Hei 8(1996)-100728.

When a fuel tank equipped with this prior-art vaporized fuel control valve is filled with fuel through a fuel gun (automatic nozzle) inserted into the filler port of the filler pipe, the pressure increase in the fuel tank produced by the rising fuel level is transmitted through the float valve and float valve communicating chamber to one side of the diaphragm valve. On the other hand, the filler port communicating chamber into which the other side surface of the diaphragm valve faces is in communication with the fuel tank filler port, which is at atmospheric pressure. A pressure difference thus arises between the float valve communicating chamber and the filler port communicating chamber, whereby the diaphragm valve operates to open the canister communicating port and communicate the float valve communicating chamber with the canister. As a result, the vaporized fuel in the fuel tank passes through the float valve, the float valve communicating chamber and the canister communicating port to the canister, where it is charged into activated carbon and thus prevented from escaping into the atmosphere.

As the supply of fuel to the tank is continued, the float valve is closed by the rising fuel level so that the fuel level in the filler pipe rises and causes the autostop device of the fuel gun to operate and stop the supply of fuel. When the fuel cap is replaced after removing the fuel gun from the filler port, the pressure difference between the filler port communicating chamber and the float valve communicating chamber falls to zero and the diaphragm valve closes to close the canister communicating port and cut off communication between the float valve communicating chamber and the canister.

In this prior-art vaporized fuel control valve, however, a fuel spray flying from the float valve at the time it is closed by the rising fuel level in the fuel tank sometimes invades the float valve communicating chamber and adheres to the diaphragm valve. The fuel adhering to the diaphragm valve may swell and degrade the rubber diaphragm, lowering its sealing property and durability.

This invention was accomplished in light of the foregoing circumstances and has as its object to provide a vaporized fuel control valve for a fuel tank of an internal combustion engine, which by a simple structure reliably prevents fuel spray from the float valve from adhering to the diaphragm valve.

SUMMARY OF THE INVENTION

This invention achieves this object by providing a vaporized fuel control valve for a fuel tank containing fuel to be supplied to an internal combustion engine, comprising a casing fastened to an upper surface of the fuel tank, a float valve housed in the casing such that it moves upward toward a seat in response to fuel level in the fuel tank, a diaphragm valve placed in the casing above the float valve for separating an interior of the casing to a first chamber and a second chamber communicating with the fuel tank through the float valve, the diaphragm valve opening to connect the second chamber with a canister such that vaporized fuel forced out of the fuel tank passes along a path through the float valve to the canister unless the float valve seats on the seat. In the valve, there is provided an interceptor placed in the path to intercept a fuel spray so as the fuel spray not to adhere to the diaphragm valve.

BRIEF EXPLANATION OF THE DRAWINGS

The foregoing and other objects and advantages of the invention will be more apparent from the following description and drawings, in which.

DETAILED DESCRIPTION OF THE PREFERRED EMBODIMENTS

Embodiments of the invention will now be explained with reference to the attached drawings.

Figure 1:
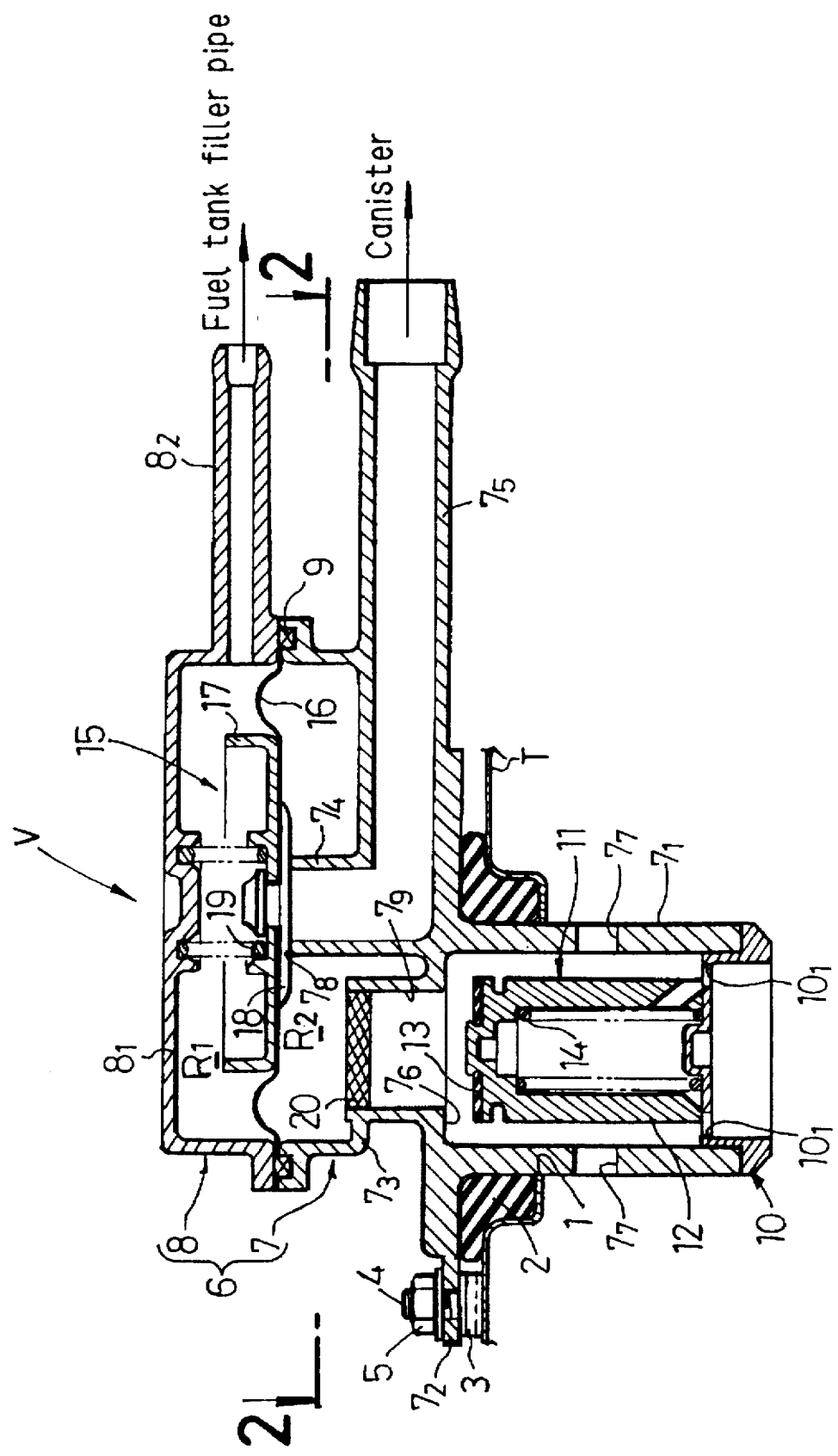
FIG. 1 is a vertical sectional view of a vaporized fuel control valve for a fuel tank of an internal combustion engine according to a first embodiment of the invention.
Figure 2:
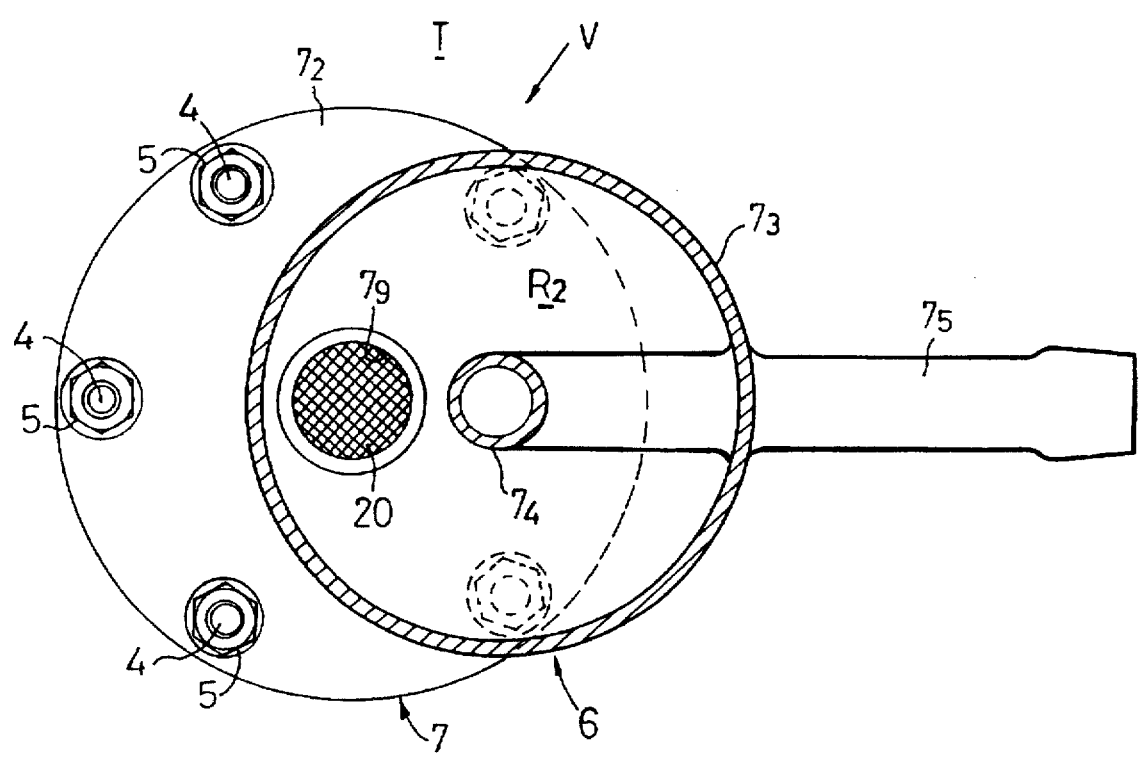
FIG. 2 is a sectional view taken along line 2—2 in FIG. 1.

FIGS. 1 and 2 show a vaporized fuel control valve for a fuel tank of an internal combustion engine according to a first embodiment of the invention. FIG. 1 is a vertical sectional view of the vaporized fuel control valve and FIG. 2 is a sectional view taken along 2—2 in FIG. 1.

As shown in FIGS. 1 and 2, the vaporized fuel control valve, designated by reference symbol V in the figures, is fit via a seal member 2 into a mounting hole 1 formed in the upper surface of the fuel tank T and fastened to the upper surface of a fuel tank T (containing fuel to be supplied to an internal combustion engine (not shown)) via a bracket 3 by stud bolts 4 rising from the fuel tank T and nuts 5. The vaporized fuel control valve V has a casing 6 comprising of a lower casing member 7 fastened to the fuel tank T by the stud bolts 4 and the nuts 5 and a upper casing member 8 united with the upper surface of the lower casing member 7 via an O-ring 9.

A float valve housing $7_1$ provided on the lower casing member 7 fits into the fuel tank mounting hole 1, which is formed in the shape of a vertical cylindrical opening. A mounting flange $7_2$ is formed at the upper end of the float valve housing $7_1$ integrally therewith, and the stud bolts 4 pass through the mounting flange $7_2$. An upward-opening dish-like diaphragm housing member $7_3$ is formed integrally with the upper portion of the float valve housing $7_1$. The diaphragm housing member $7_3$ has a larger diameter than the float valve housing $7_1$ and its axis is offset from the axis of the float valve housing $7_1$.

A cylindrical wall $7_4$ is formed integrally with the diaphragm housing member $7_3$ at the center thereof. The lower end of the cylindrical wall $7_4$ extends radially outward into a coupling member $7_5$ which connects with a canister (not shown) of the engine.

The upper casing member 8 is formed with a downward-opening dish-like diaphragm housing member $8_1$ and a coupling member $8_2$ projecting radially outward from the diaphragm housing member $8_1$. The coupling member $8_2$ is connected with a filler pipe (not shown) of the fuel tank T near the filler port formed at the upper end thereof.

A floor plate 10 is fit in the opening at the lower end of the float valve housing $7_1$ of the lower casing member 7 and a float valve 11 is disposed on the upper surface of the floor plate 10. The float valve 11 comprises a cylindrical float 12, a valve body 13 fixed on the upper surface of the float 12 and a spring 14 compressed between the floor plate 10 and the float 12 for applying an upward buoyancy-assisting force on the float 12. On the other hand, a valve seat $7_6$ for the valve body 13 is formed at the upper end of the float valve housing $7_1$. Communicating holes $7_7$ and holes $10_1$ are formed respectively in the side wall of the float valve housing $7_1$ and the floor plate 10 so as to communicate the interior of the fuel tank T with the interior of the float valve housing $7_1$.

A diaphragm valve 15 is disposed between the lower casing member 7 and the upper casing member 8. The diaphragm valve 15 comprises a diaphragm 16 clamped between the edge portions of the casing members 7, 8, a spring seat 17 overlying the upper surface of the diaphragm 16, a valve member 18 seatable on a valve seat $7_8$ formed at the upper end of the cylindrical wall $7_4$ to overlie the lower surface of the diaphragm 16, and a spring 19 compressed between the upper casing member 8 and the spring seat 17 to urge the valve member 18 toward the valve seat $7_8$. The valve seat $7_8$ constitutes a canister communication port in this embodiment.

In addition, a filler port communicating chamber or a first chamber $R_1$ is defined between the upper surface of the diaphragm 16 and the upper casing member 8 to communicate with the filler pipe in the vicinity of the filler port via the coupling member $8_2$, and a float valve communicating chamber or a second chamber $R_2$ is defined under the diaphragm 16 to communicate with the float valve 11. When the diaphragm valve 15 is closed, i.e., when the valve member 18 is seated on the valve seat $7_8$, as illustrated in FIG. 1, communication between the float valve communicating chamber or a second chamber $R_2$ and the canister is cut off, while when the diaphragm valve 15 is open, i.e., when the valve member 18 is off the valve seat $7_8$, the float valve communicating chamber $R_2$ and the canister are in communication.

The float valve communicating chamber $R_2$ is provided with a float valve communicating port $7_9$ communicating with the interior of the float valve housing $7_1$. A filter or interceptor 20 made of metal mesh or the like is installed in the upper end of the float valve communicating port $7_9$.

The operation of the so-configured vaporized fuel control valve according to the first embodiment of the invention will now be explained.

In the normal state when fuel is not being supplied to the fuel tank T, the pressures in the filler port communicating chamber $R_1$ and the float valve communicating chamber $R_2$ are both equal to the pressure in the fuel tank T and, therefore, the valve member 18 of the diaphragm valve 15 is seated on the valve seat $7_8$ by the force of the spring 19, cutting off communication between the float valve communicating chamber $R_2$ and the canister.

When fuel is supplied to the tank from a fuel gun inserted into the filler port of the filler pipe, the pressure in the fuel tank T rises owing to the rising fuel level. As a result, the pressure in the float valve communicating chamber $R_2$, which communicates with the interior of the fuel tank T through the float valve 11, also rises. On the other hand, the filler port communicating chamber $R_1$ stays at atmospheric pressure owing to its communication with the filler pipe at a point near the filler port, which is at atmospheric pressure. The resulting pressure difference between the float valve communicating chamber $R_2$ and the filler port communicating chamber $R_1$ pushes the diaphragm 16 of the diaphragm valve 15 against the force of the spring 19, whereby the valve member 18 separates from the valve seat $7_8$ to communicate or connect the float valve communicating chamber $R_2$ with the canister.

As a result, the vaporized fuel forced out of the fuel tank T by the rising fuel level passes or flows through the float valve 11, the float valve communicating port $7_9$, the filter 20, the float valve communicating chamber $R_2$, the valve seat $7_8$ and the coupling member $7_5$ to the canister, where it is charged into activated carbon and thus prevented from escaping into the atmosphere.

When the fuel in the fuel tank T thereafter reaches the full level, it pushes up the float 12 and causes the valve body 13 to seat on the valve seat $7_6$, cutting off communication between the interior of the fuel tank T and the float valve communicating chamber $R_2$. Further supply of fuel therefore causes the fuel level in the filler pipe to rise rapidly and actuate the autostop device of the fuel gun. This stops the supply of fuel. When the fuel cap is replaced after removing the fuel gun from the filler port, the pressure difference between the filler port communicating chamber $R_1$ and the float valve communicating chamber $R_2$ falls to zero and the diaphragm valve 15 closes to cut off communication between the float valve communicating chamber $R_2$ and the canister. The normal state is thus restored.

At the time the rising level of the fuel closes the float valve 11 to shut the float valve communicating port $7_9$ of the float valve communicating chamber $R_2$, the impact of the valve body 13 seating on the valve seat $7_6$ may produce a fuel spray. Even if it does, however, the sprayed fuel is intercepted or blocked by the filter 20 and cannot reach the float valve communicating chamber $R_2$. Since adherence of sprayed fuel to the diaphragm 16 of the diaphragm valve 15 located at the top of the float valve communicating chamber $R_2$ can therefore be avoided, the diaphragm 16 can be prevented from experiencing decreased sealing property and durability owing to swelling and degradation.

Figure 3:
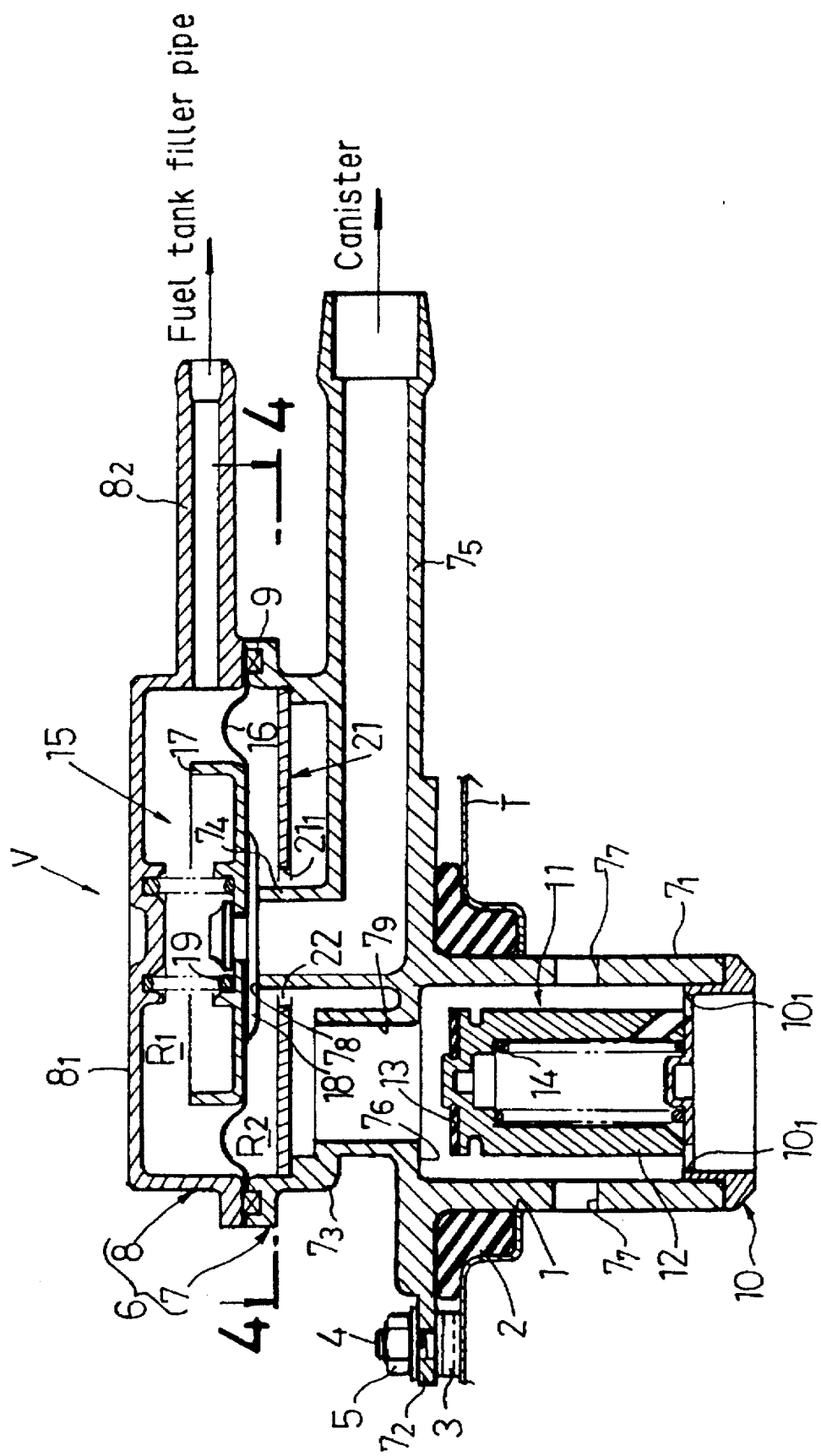
FIG. 3 is a vertical sectional view of a vaporized fuel control valve for a fuel tank of an internal combustion engine according to a second embodiment of the invention.
Figure 4:
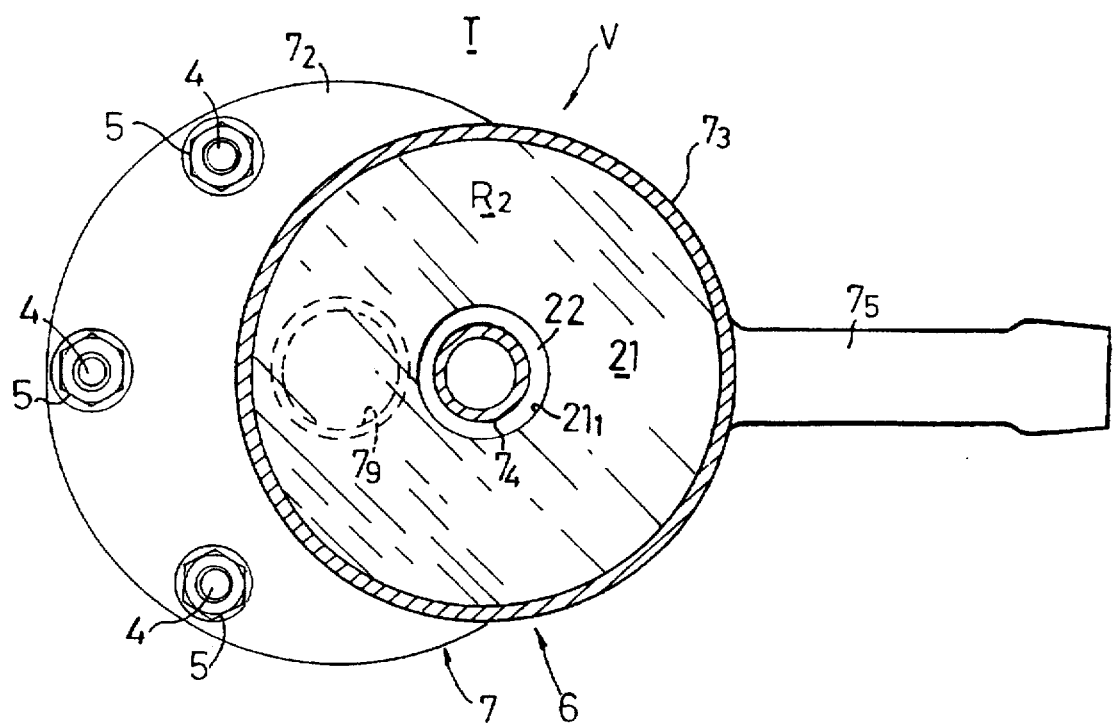
FIG. 4 is a sectional view taken along line 4—4 in FIG. 3.

The vaporized fuel control valve according to a second embodiment of the invention will now be explained with reference to FIGS. 3 and 4. Valve members of the second embodiment which are the same as those of the first embodiment will be assigned the same reference symbols as those in the first embodiment.

The vaporized fuel control according to the second embodiment comprises a doughnut-shaped partition 21 (a buffer plate or interceptor placed above the float valve 11 in a plane perpendicular to the direction in which the float 12 moves) that divides the float valve communicating chamber $R_2$ into upper and lower sections. The partition 21 is formed at the center with a circular through-hole $21_1$ that fits loosely around the cylindrical wall $7_4$ so as to leave an annular gap 22 between the through-hole $21_1$ and the cylindrical wall $7_4$. As shown in FIG. 4, the float valve communicating port $7_9$ and the gap 22 are offset from each other so as not to overlap in plan view.

Vaporized fuel in the fuel tank T can reach the upper section of the float valve communicating chamber $R_2$ through the float valve housing $7_1$, the float valve communicating port $7_9$ and the gap 22 but fuel spray produced by the impact of the valve body 13 of the float 12 seating on the valve seat $7_6$ is intercepted by the partition 21 and cannot reach the upper section of the float valve communicating chamber $R_2$. Since adherence of sprayed fuel to the diaphragm 16 of the diaphragm valve 15 located at the top of the float valve communicating chamber $R_2$ can therefore be avoided, the diaphragm 16 can be prevented from experiencing decreased sealing property and durability owing to swelling and degradation.

Figure 5:
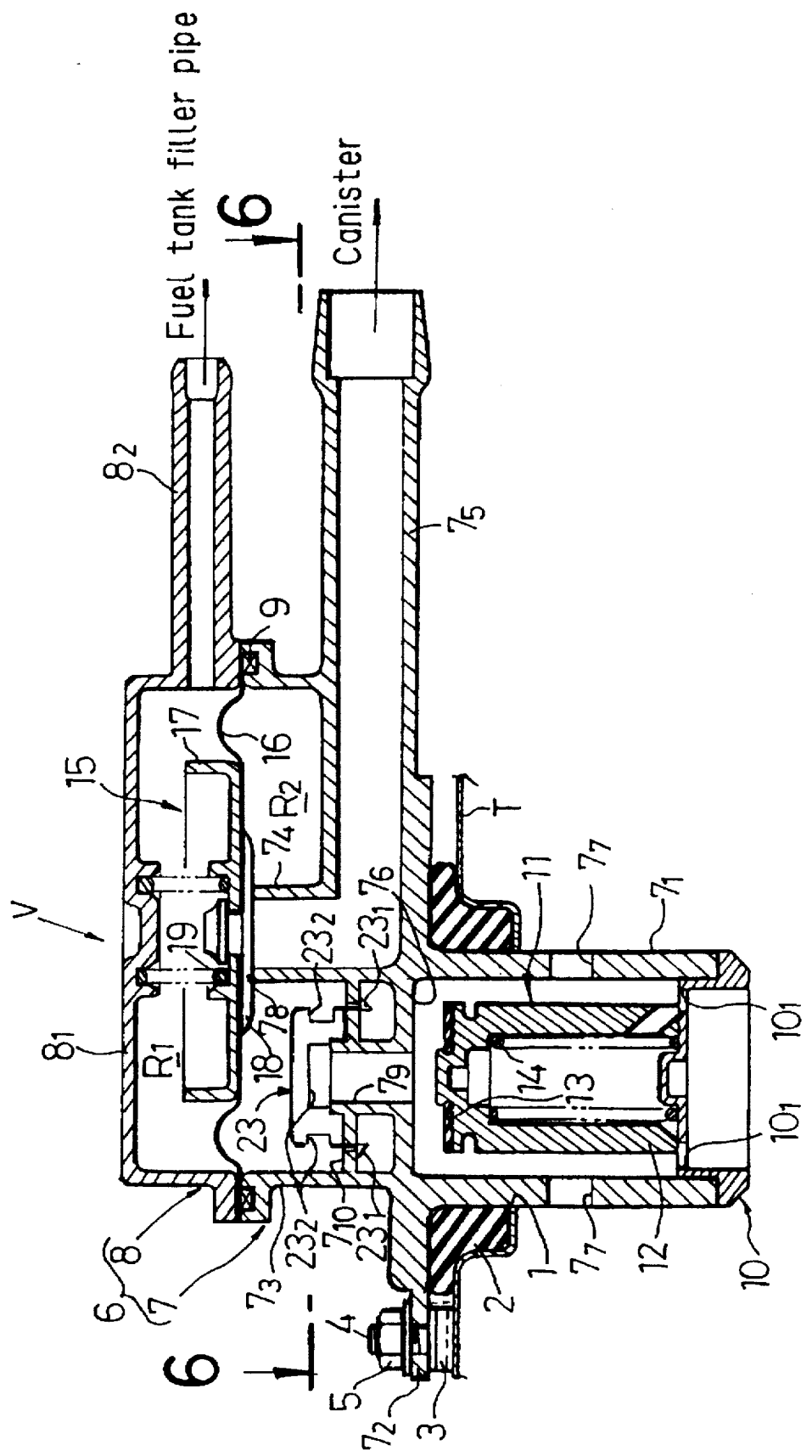
FIG. 5 is a vertical sectional view of a vaporized fuel control valve for a fuel tank of an internal combustion engine according to a third embodiment of the invention.
Figure 6:
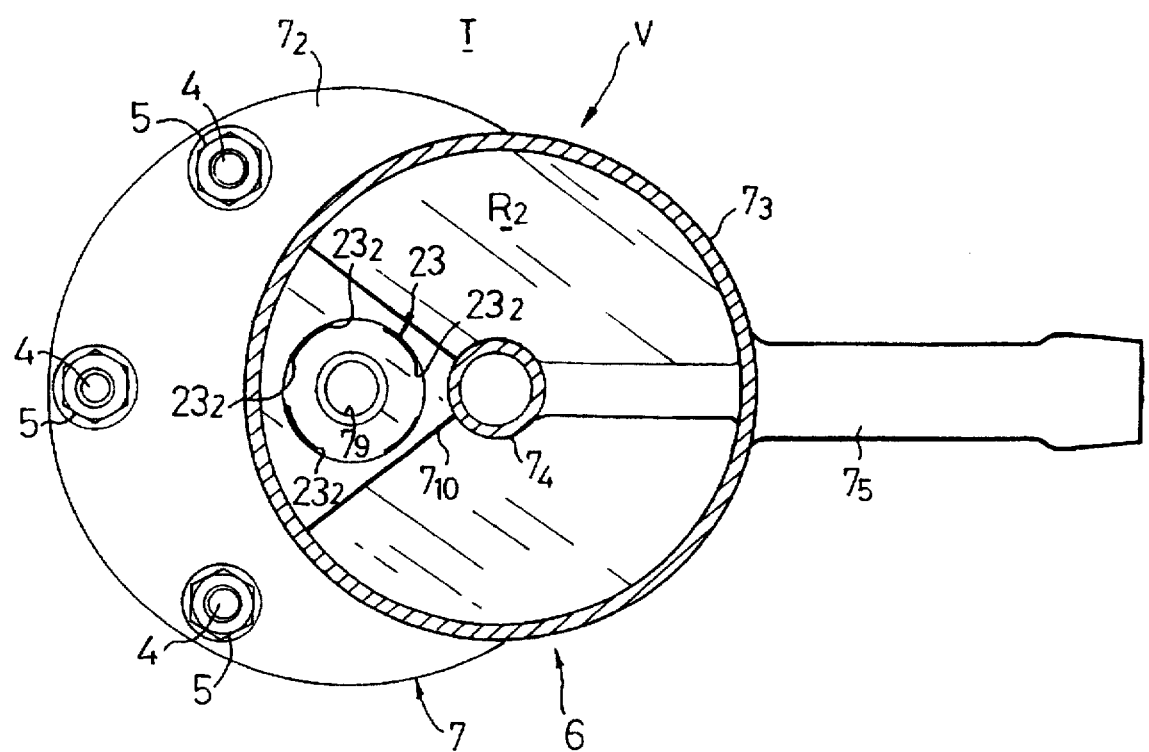
FIG. 6 is a sectional view taken along line 6—6 in FIG. 5.

The vaporized fuel control valve according to a third embodiment of the invention will now be explained with reference to FIGS. 5 and 6. Valve members of the third embodiment which are the same as those of the first embodiment will be assigned the same reference symbols as those in the first embodiment.

In the valve according to the third embodiment, a fan-shaped mounting plate $7_{10}$ is provided in the float valve communicating chamber $R_2$ so as to surround the float valve communicating port $7_9$. A cover 23 shaped like an inverted cup (and acting as the aforesaid buffer plate or intercepter) is removably fixed on the mounting plate $7_{10}$ via legs $23_1$. The cover 23 is closed at the top but is formed with four side through-holes $23_2$.

Thus, vaporized fuel in the fuel tank T can reach the float valve communicating chamber $R_2$ through the float valve housing $7_1$, the float valve communicating port $7_9$ and the through-holes $23_2$ of the cover 23 but fuel spray produced by the impact of the valve body 13 of the float 12 seating on the valve seat $7_6$ is intercepted by the cover 23 and cannot reach the float valve communicating chamber $R_2$. Adherence of sprayed fuel to the diaphragm 16 is therefore prevented.

Figure 7:
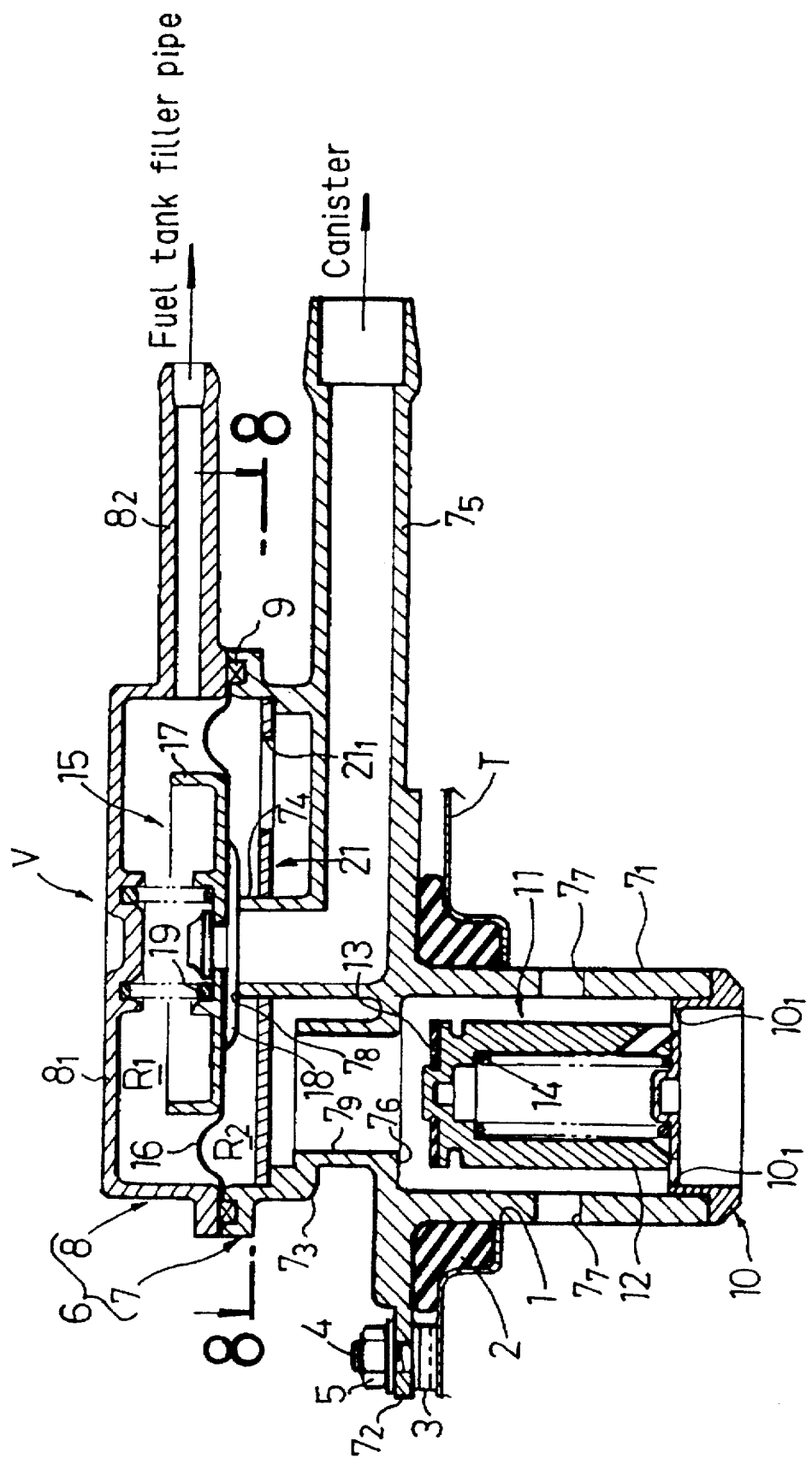
FIG. 7 is a vertical sectional view of a vaporized fuel control valve for a fuel tank of an internal combustion engine according to a fourth embodiment of the invention.
Figure 8:
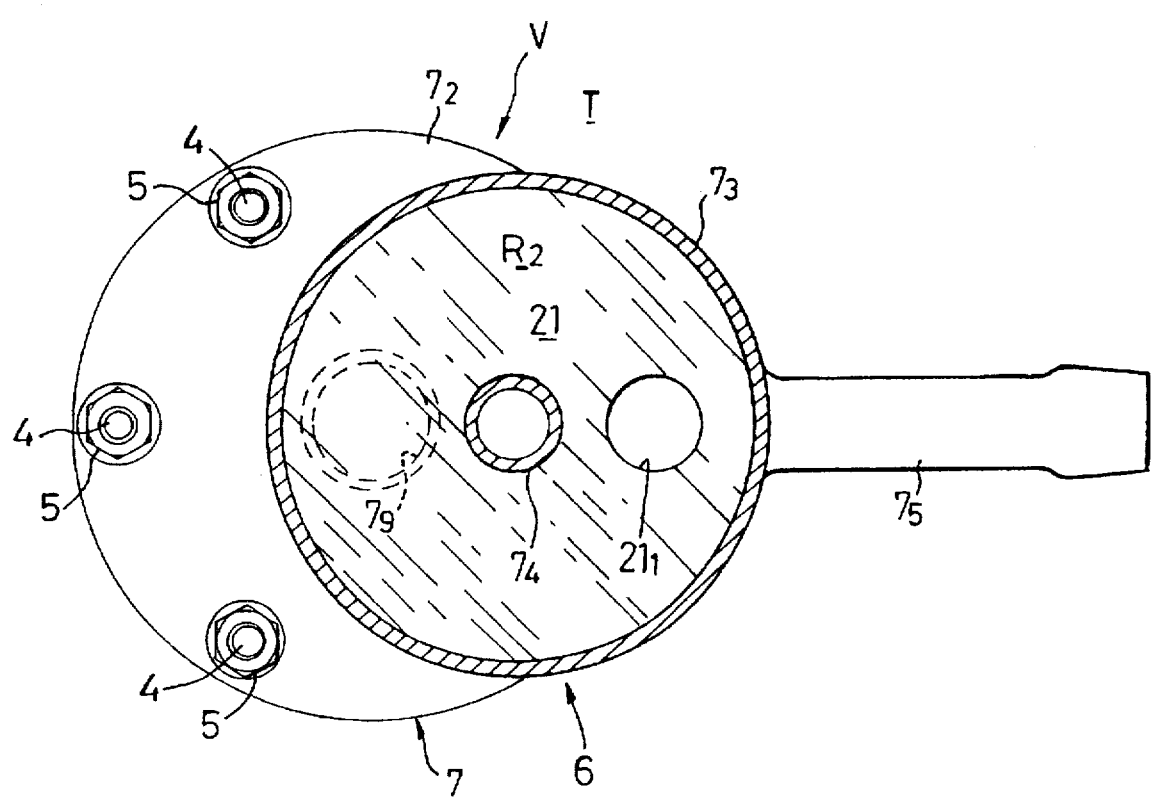
FIG. 8 is a sectional view taken along line 8—8 in FIG. 7.

The vaporized fuel control valve according to a fourth embodiment of the invention will now be explained with reference to FIGS. 7 and 8. Valve members of the fourth embodiment which are the same as those of the first embodiment will be assigned the same reference symbols as those in the first embodiment.

The valve of the fourth embodiment is similar to that of the second embodiment but differs in the location of the through-hole $21_1$ formed in the partition (intercepter) 21, which in the valve of this embodiment is provided on the opposite side of the cylindrical wall $7_4$ from the float valve communicating port $7_9$. The through-hole is thus provided at a position offset from the float valve communicating port $7_9$.

As in the valve of the second embodiment, fuel spray produced by the impact of the valve body 13 of the float 12 seating on the valve seat $7_6$ is intercepted by the partition 21 and cannot reach the float valve communicating chamber $R_2$. Adherence of sprayed fuel to the diaphragm 16 is therefore prevented.

Figure 9:
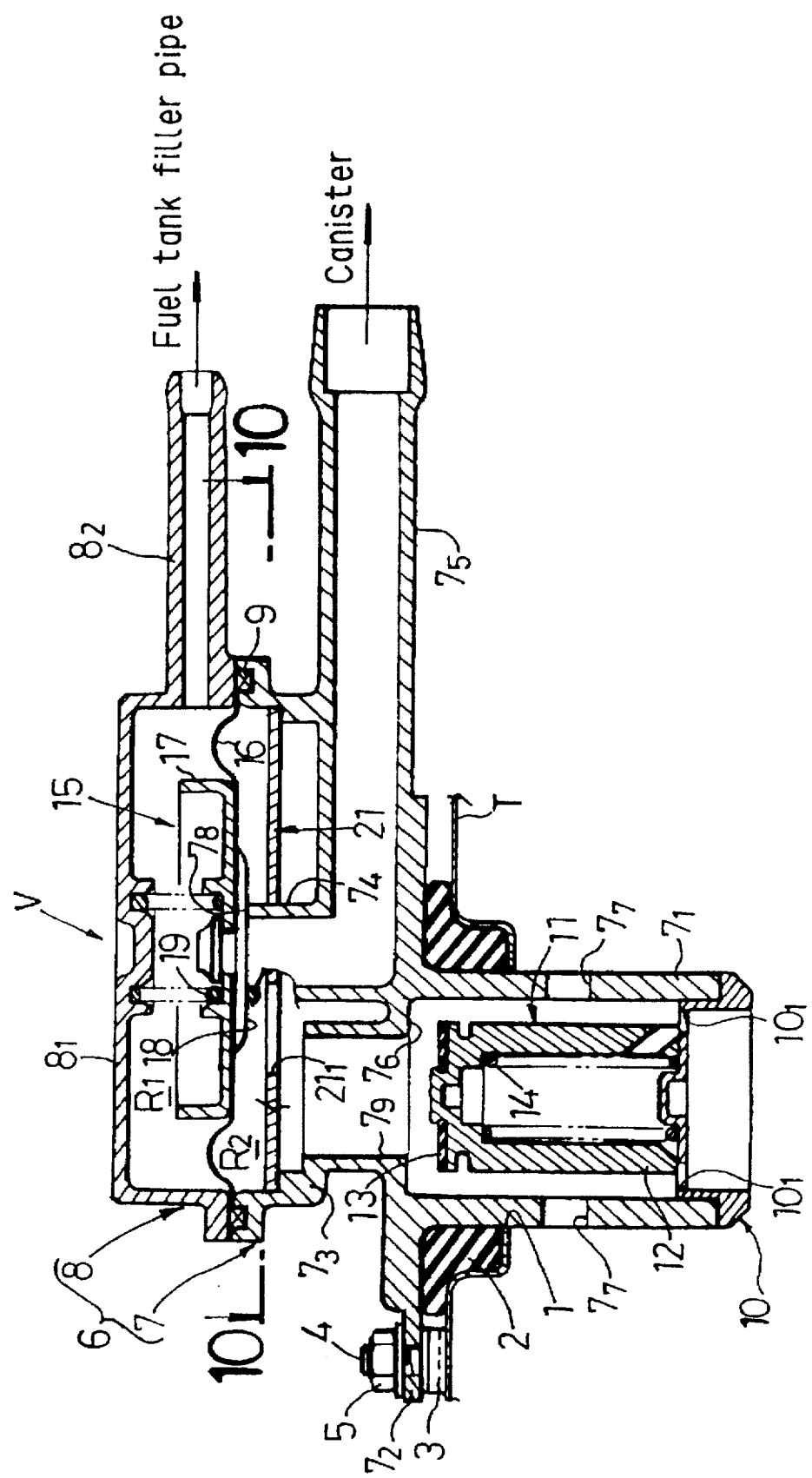
FIG. 9 is a vertical sectional view of a vaporized fuel control valve for a fuel tank of an internal combustion engine according to a fifth embodiment of the invention.
Figure 10:
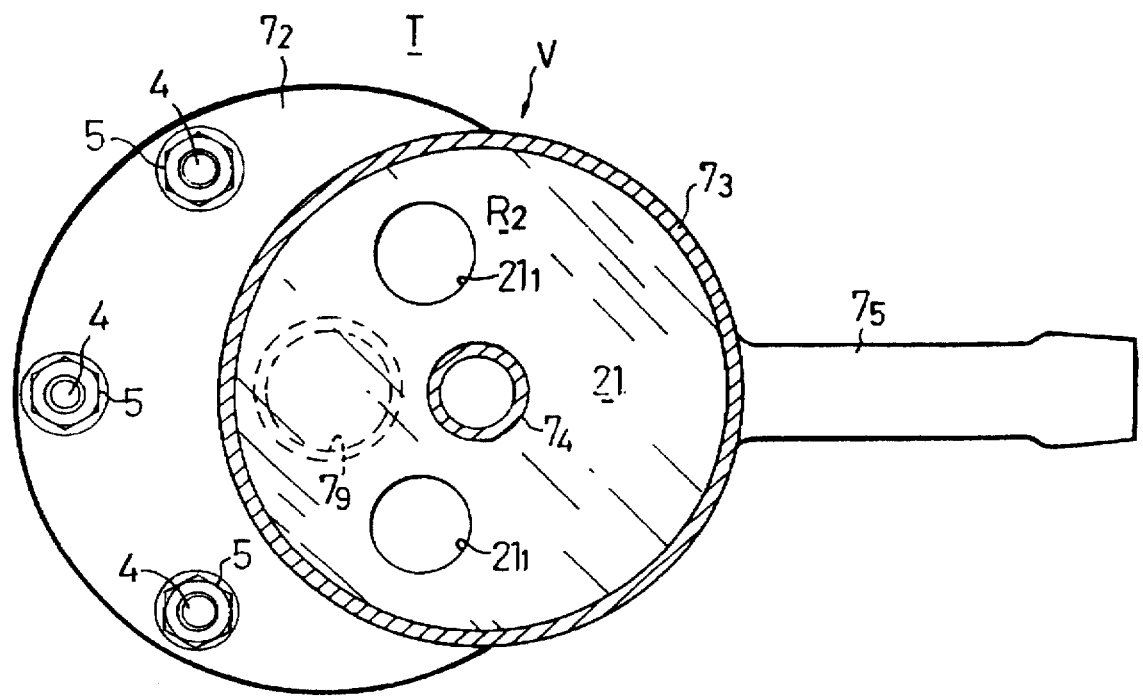
FIG. 10 is a sectional view taken along line 10—10 in FIG. 9.

The vaporized fuel control valve according to a fifth embodiment of the invention will now be explained with reference to FIGS. 9 and 10. Valve members of the fifth embodiment which are the same as those of the first embodiment will be assigned the same reference symbols as those in the first embodiment.

The valve of the fifth embodiment is similar to that of the fourth embodiment but the partition (intercepter) 21 is formed with a plurality of through-holes, specifically two through-holes $21_1$, $21_1$ at positions offset from the float valve communicating port $7_9$.

The valve of the fifth embodiment produces the same effect as that of the fourth embodiment.

Figure 11:
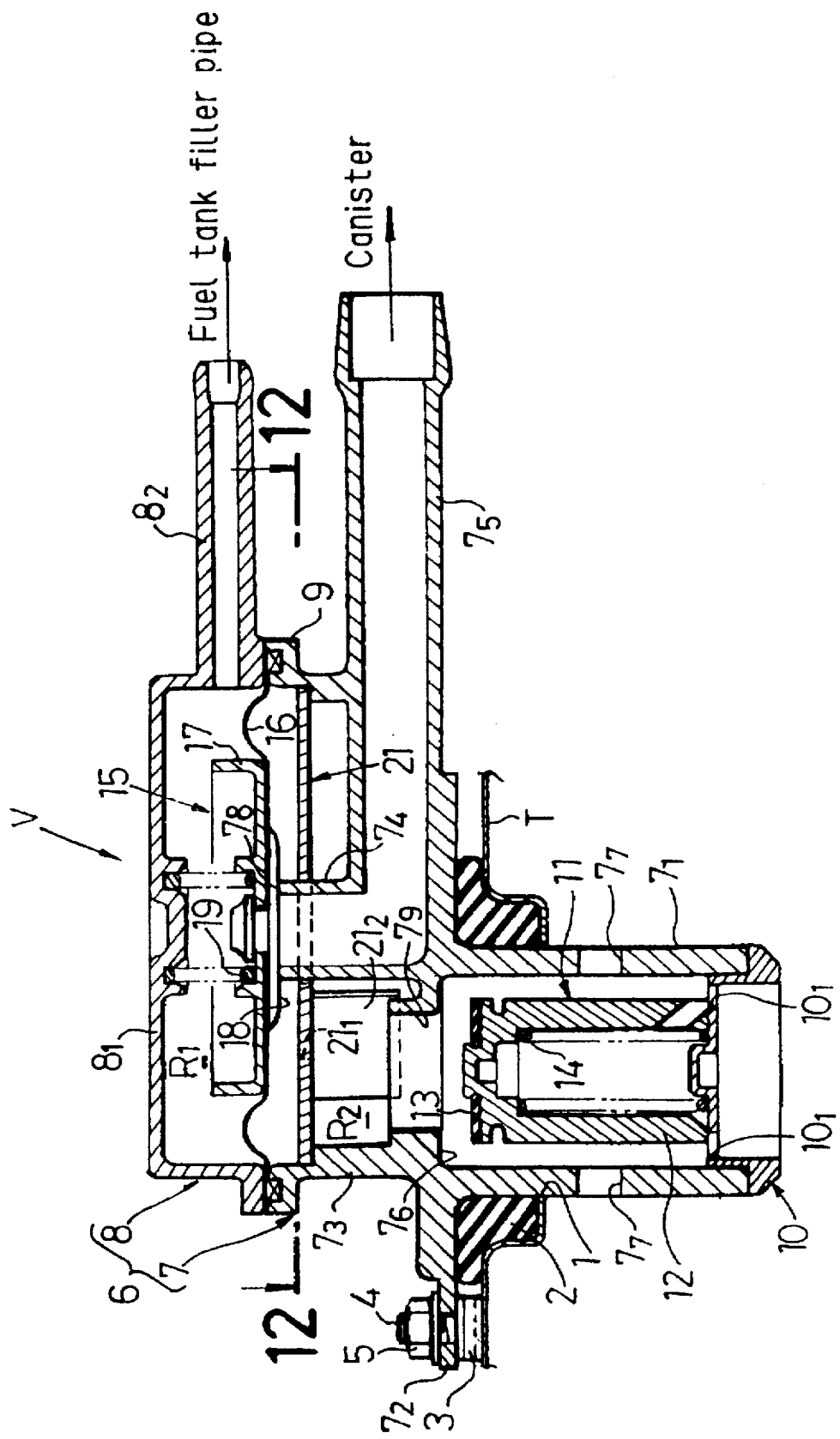
FIG. 11 is a vertical sectional view of a vaporized fuel control valve for a fuel tank of an internal combustion engine according to a sixth embodiment of the invention.
Figure 12:
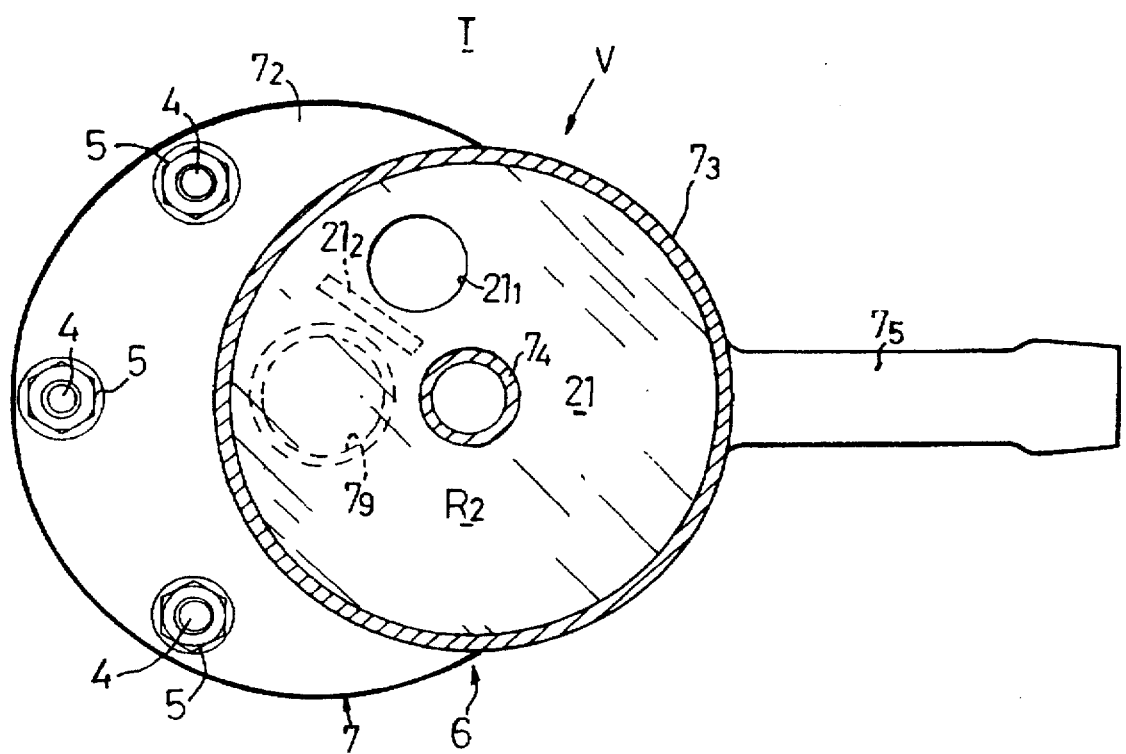
FIG. 12 is a sectional view taken along line 12—12 in FIG. 11.

The vaporized fuel control valve according to a sixth embodiment of the invention will now be explained with reference to FIGS. 11 and 12. Valve members of the sixth embodiment which are the same as those of the first embodiment will be assigned the same reference symbols as those in the first embodiment.

In the valve of the sixth embodiment, the partition or intercepter 21 is formed with a single through-hole $21_1$ and a baffle plate $21_2$ is disposed to extend vertically downward from the partition 21 at a point between the through-hole $21_1$ and the float valve communicating port $7_9$.

Fuel spray which passes upward through the float valve communicating port $7_9$ to the bottom portion of the float valve communicating chamber $R_2$ is accordingly blocked by the baffle plate $21_2$ and cannot reach the through-hole $21_1$ of the partition 21. Adherence of sprayed fuel to the diaphragm 16 is therefore prevented.

Figure 13:
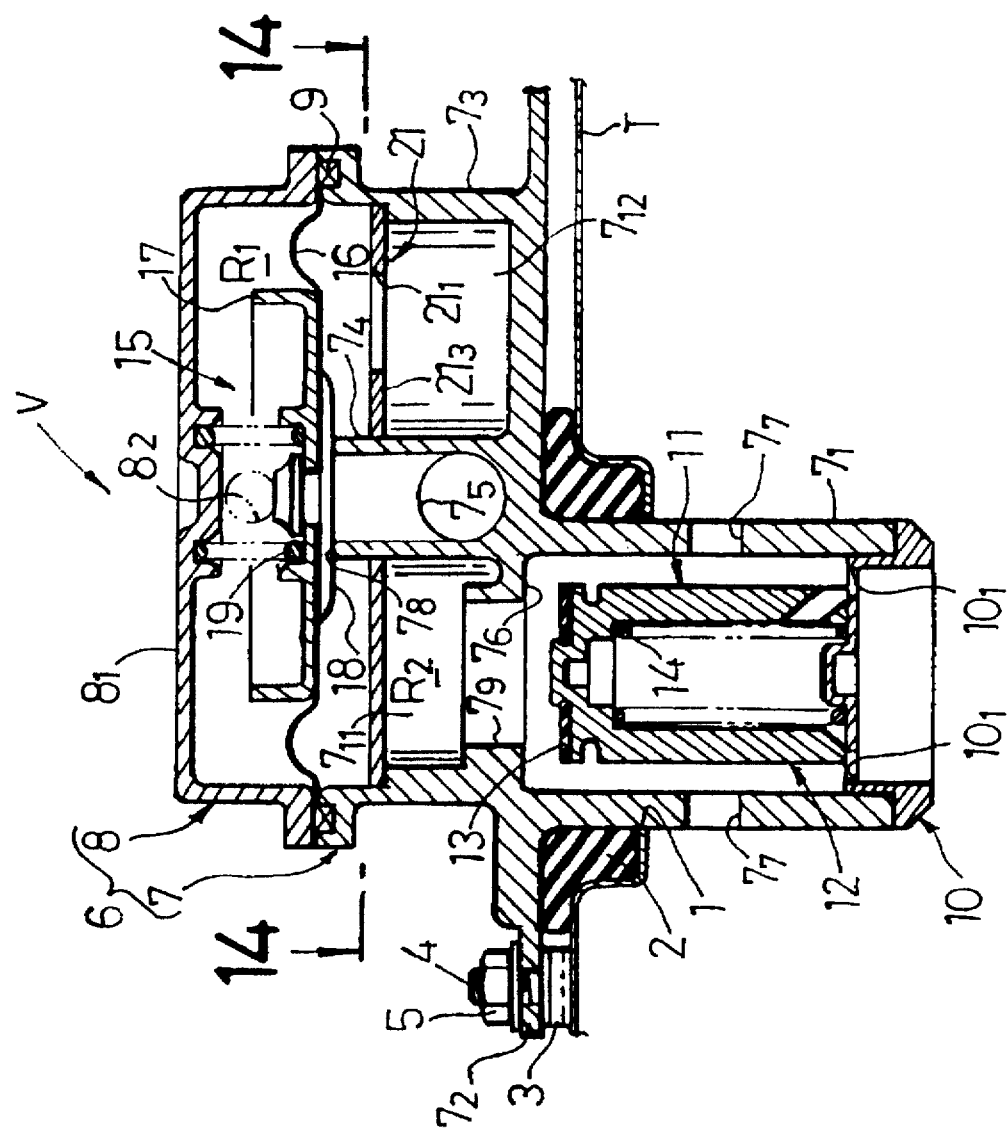
FIG. 13 is a vertical sectional view of a vaporized fuel control valve for a fuel tank of an internal combustion engine according to a seventh embodiment of the invention.

The vaporized fuel control valve according to a seventh embodiment of the invention will now be explained with reference to FIGS. 13 and 14. Valve members of the seventh embodiment which are the same as those of the first embodiment will be assigned the same reference symbols as those in the first embodiment.

In the valve of the seventh embodiment, the through-hole $21_1$ of the partition or intercepter 21 is provided on the opposite side of the cylindrical wall $7_4$ from the float valve communicating port $7_9$, and the underside of the partition 21 is formed with two arcuate partitions $7_{11}$, $7_{12}$ enclosing about half the periphery of the float valve communicating port $7_9$ and half the periphery of the through-hole $21_1$. (The arcuate partitions are thus placed above the float valve 11 in a plane parallel with the direction in which the float 12 moves.) The lower portion (or a third chamber) of the float valve communicating chamber $R_2$ is defined on one side of the two partitions $7_{11}$, $7_{12}$ (the side of the float valve communicating port $7_9$ and the through-hole $21_1$). A ceiling $21_3$ is formed between the through-hole $21_1$ and the partition $7_{12}$ by establishing a prescribed distance L (illustrated in FIG. 14) between the periphery of the through-hole $21_1$ and the partition $7_{12}$.

Figure 14:
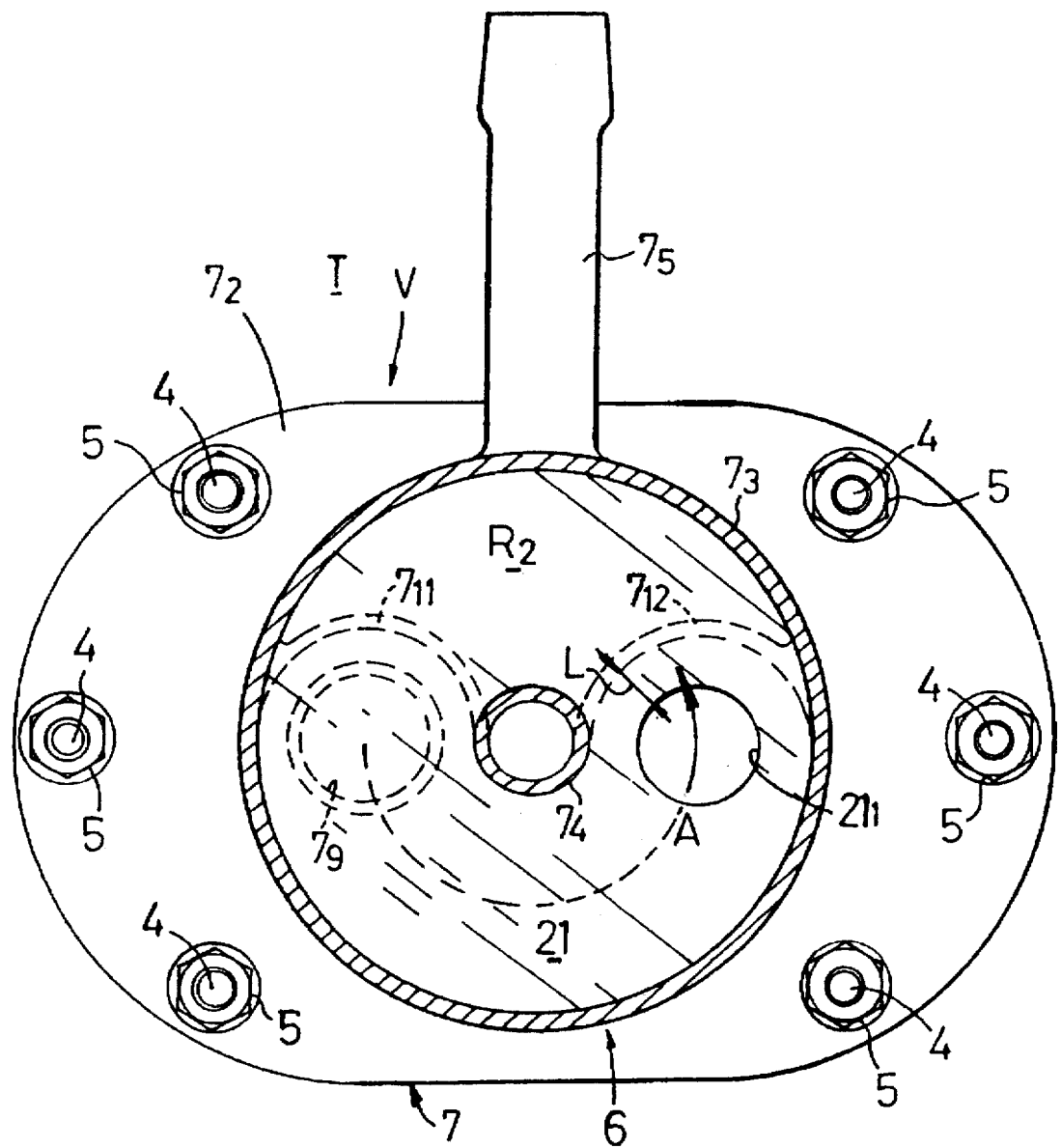
FIG. 14 is a sectional view taken along line 14—14 in FIG. 13.

Therefore, even if fuel spray should invade the lower portion of the float valve communicating chamber $R_2$ from the float valve communicating port $7_9$, pass in the direction of the arrow A in FIG. 14 and shoot upward upon collision with the partition $7_{12}$, it will be intercepted by the ceiling $21_3$ overhanging by the distance L and prevented from passing through the through-hole $21_1$. As a result, adherence of sprayed fuel to the diaphragm 16 is even more reliably prevented.

Figure 15:
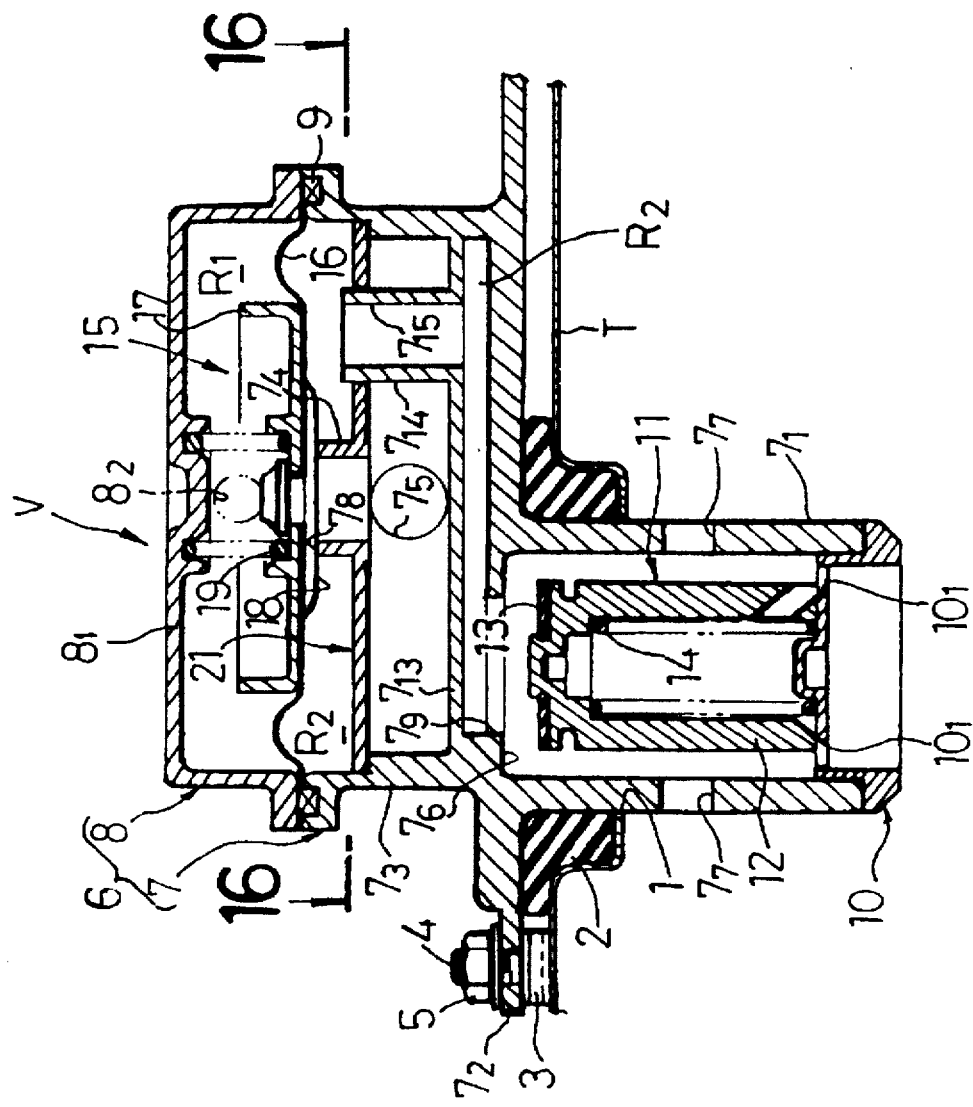
FIG. 15 is a vertical sectional view of a vaporized fuel control valve for a fuel tank of an internal combustion engine according to an eighth embodiment of the invention.
Figure 16:
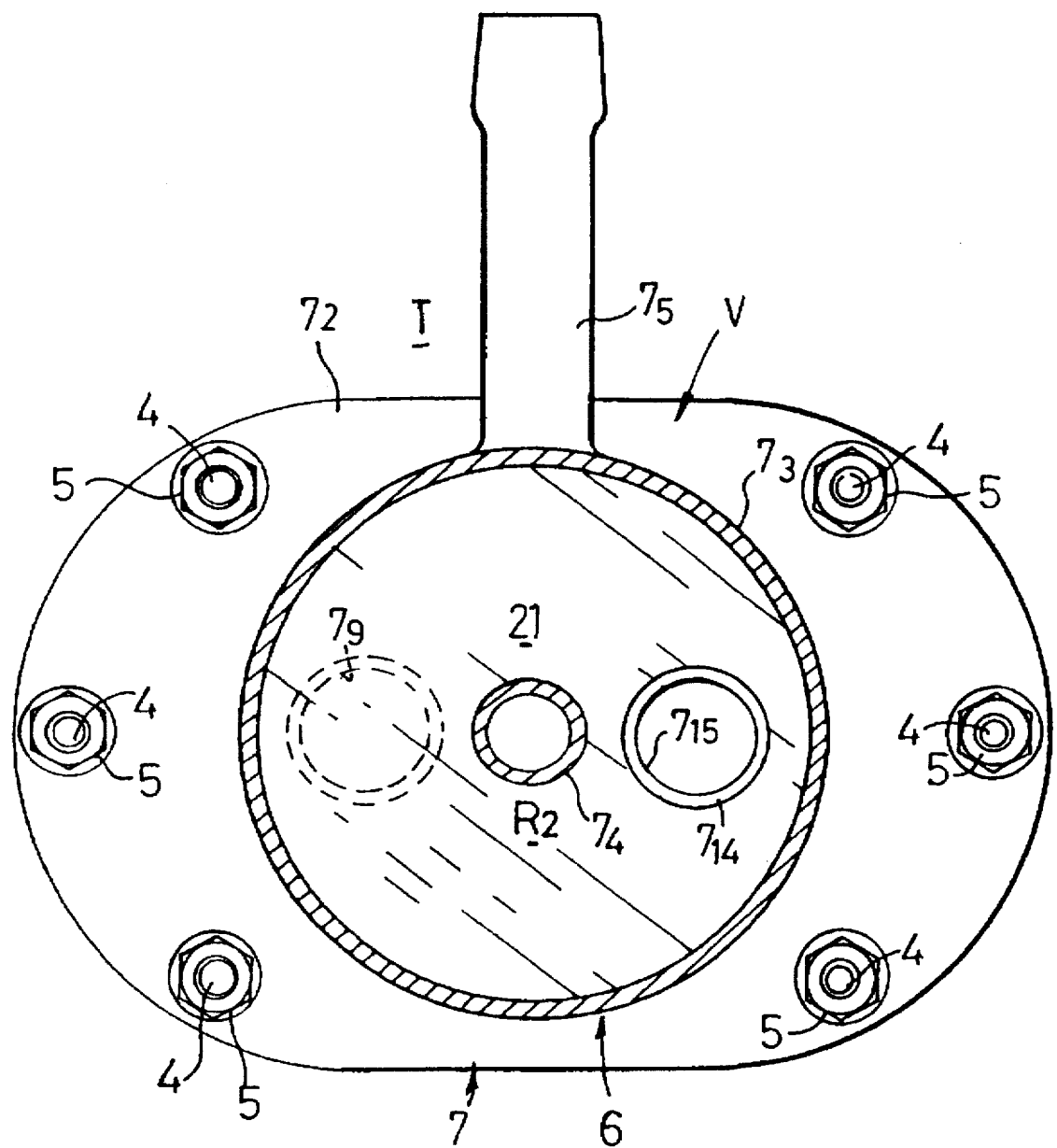
FIG. 16 is a sectional view taken along line 16—16 in FIG. 15.

The vaporized fuel control valve according to an eighth embodiment of the invention will now be explained with reference to FIGS. 15 and 16. Valve members of the eighth embodiment which are the same as those of the first embodiment will be assigned the same reference symbols as those in the first embodiment.

In the valve of the eighth embodiment, a lower or second partition $7_{13}$ is provided below an upper partition 21 (corresponding to the partition or intercepter 21 of the second and fourth to seventh embodiments) integrally with the lower casing member 7, thereby defining the lower half of the float valve communicating chamber $R_2$ below the lower partition $7_{13}$, defining a (third) chamber communicating with the canister between the lower partition $7_{13}$ and the upper partition 21, and forming the upper half of the float valve communicating chamber $R_2$ above the partition 21. A cylindrical wall $7_{14}$ is provided to rise from the lower partition $7_{13}$ at a position offset 180° from the float valve communicating port $7_9$. The upper and lower halves of the float valve communicating chamber $R_2$ are communicated by a through-hole $7_{15}$ formed inside the cylindrical wall $7_{14}$.

The through-hole $7_{15}$ formed within the vertically long cylindrical wall $7_{14}$ of this eighth embodiment reliably prevents fuel spray from invading the upper half of the float valve communicating chamber $R_2$.

The present invention has thus been shown and described with reference to specific embodiments. However, it should be noted that the present invention is in no way limited to the details of the described arrangements but changes and modifications may be made without departing from the scope of the appended claims.

What is claimed is:

1. A vaporized fuel control valve for a fuel tank containing fuel to be supplied to an internal combustion engine, comprising:

a casing fastened to an upper surface of the fuel tank;

a float valve housed in the casing such that it moves upward toward a seat in response to fuel level in the fuel tank;

a diaphragm valve placed in the casing above the float valve for separating an interior of the casing to a first chamber and a second chamber communicating with the fuel tank through the float valve, the diaphragm valve opening to connect the second chamber with a canister such that vaporized fuel forced out of the fuel tank passes along a path through the float valve to the canister unless the float valve seats on the seat;

wherein the improvement comprises:

an intercepter placed in the path to intercept a fuel spray so as the fuel spray not to adhere to the diaphragm valve.

2. A valve according to claim 1, wherein the interceptor is a filter placed in the path above the float valve.

3. A valve according to claim 1, wherein the interceptor is a buffer plate placed in the path above the float valve to block the fuel spray.

4. A valve according to claim 3, wherein the buffer plate is a cover closed at its top and having a hole at its side such that the vaporized fuel passes through the hole toward the canister.

5. A valve according to claim 4, wherein the cover is shaped like an inverted cup which is closed at the top and has holes at the side.

6. A valve according to claim 3, wherein the buffer plate is a partition placed above the float valve and having a hole formed therethrough such that the vaporized fuel passes through the hole toward the canister.

7. A valve according to claim 6, wherein the partition is placed in a plane perpendicular to a direction in which the float valve moves.

8. A valve according to claim 7, wherein the hole is formed at a position offset from a position that is immediately above the float valve.

9. A valve according to claim 7, wherein the partition is formed with a plurality of holes.

10. A valve according to claim 9, wherein the plurality of holes are formed at positions offset from the position that is immediately above the float valve.

11. A valve according to claim 7, wherein the partition has a baffle plate positioned in the path to block the fuel spray.

12. A valve according to claim 11, wherein the baffle plate is disposed to extend vertically downward from the partition to block the fuel spray.

13. A valve according to claim 6, wherein the partition is placed in a plane parallel with a direction in which the float valve moves.

14. A valve according to claim 13, wherein the partition defines a third chamber in the second chamber such that the third chamber communicates with the second chamber through the hole.

15. A valve according to claim 14, wherein the partition has a ceiling formed with the hole that overhangs to the hole by a predetermined distance.

16. A valve according to claim 14, wherein the partition is arcuate to enclose about half periphery of at least the hole.

17. A valve according to claim 13, wherein the partition has a second partition placed above the float valve in parallel with the first partition to form a third chamber in the second chamber that communicates with the canister.

* * * * *